No. 619,081. Patented Feb. 7, 1899.
E. A. LOSEE.
AUTOMATIC STOCK WATERER.
(Application filed July 23, 1896. Renewed Dec 30, 1898.)
(No Model.) 3 Sheets—Sheet 1.
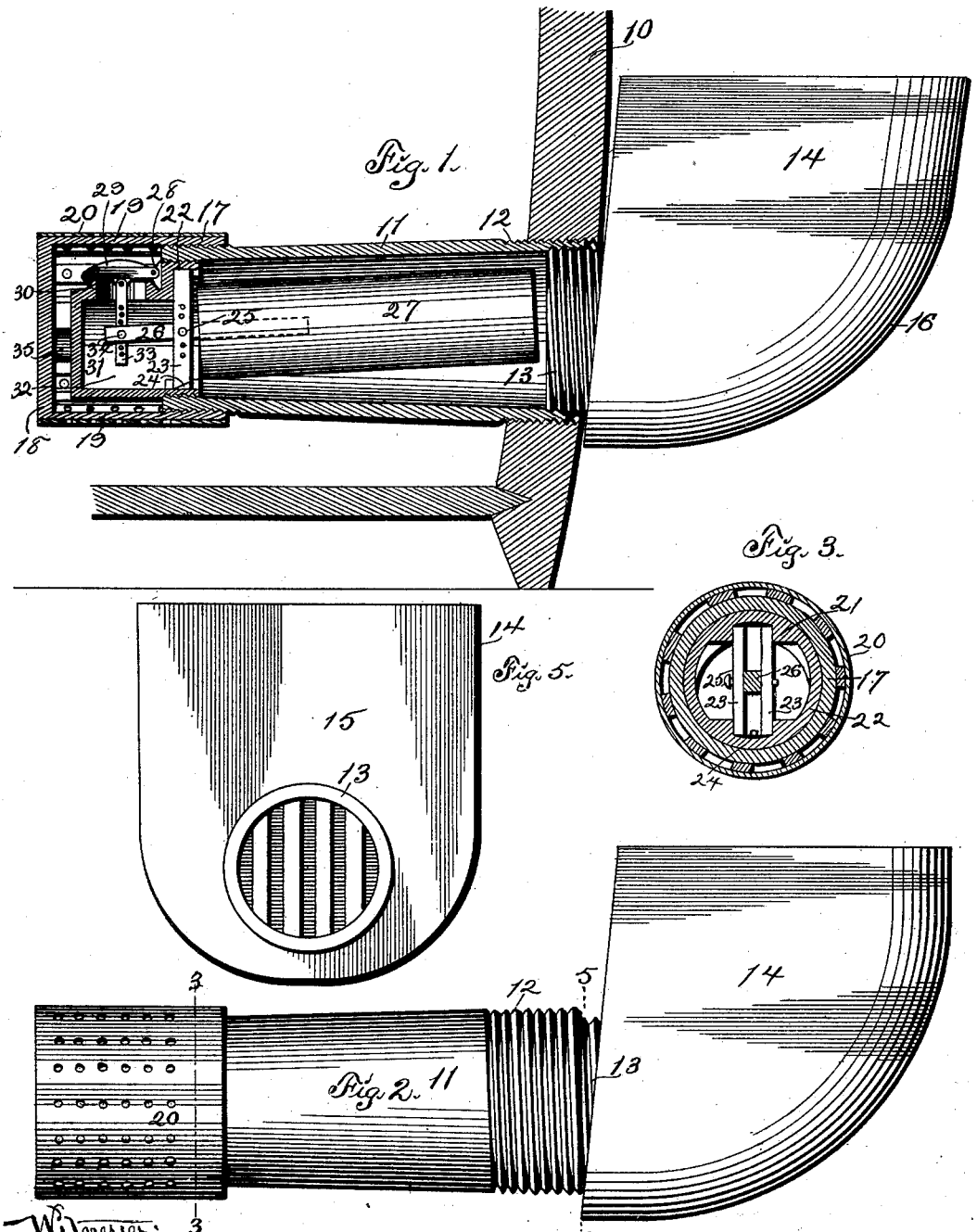

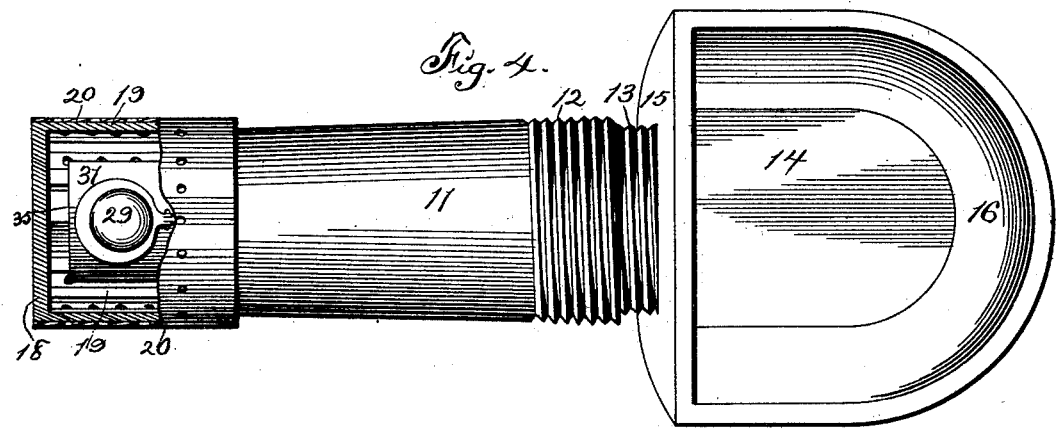
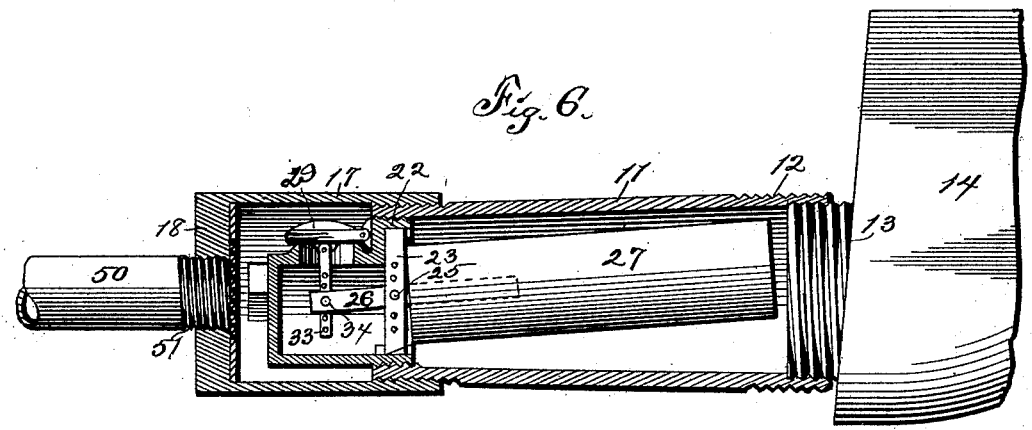

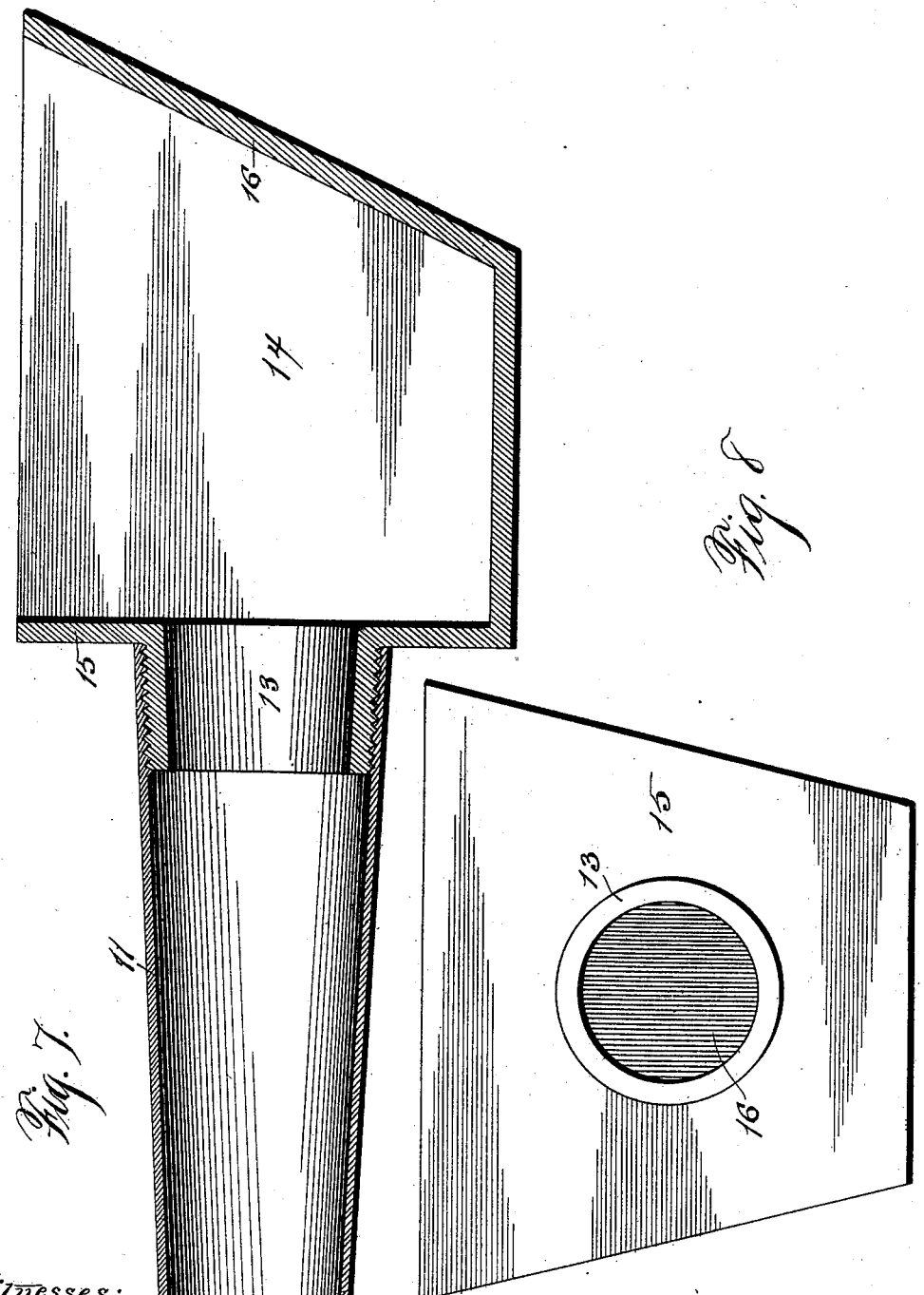

UNITED STATES PATENT OFFICE.

EZRA A. LOSEE, OF LAKE CITY, IOWA.

AUTOMATIC STOCK-WATERER.

SPECIFICATION forming part of Letters Patent No. 619,081, dated February 7, 1899.

Application filed July 23, 1896. Renewed December 30, 1898. Serial No. 700,717. (No model.)

*To all whom it may concern:*

Be it known that I, EZRA A. LOSEE, a citizen of the United States of America, and a resident of Lake City, in the county of Calhoun and State of Iowa, have invented a new and useful Automatic Stock-Waterer, of which the following is a specification.

The object of this invention is to provide improved means for feeding water from a tank or similar source of supply automatically to drinking-cups located conveniently for use by swine or other animals and poultry.

My invention consists in the construction, arrangement, and combination of elements hereinafter set forth, pointed out in my claims, and illustrated by the accompanying drawings, in which—

Figure 1 is an sectional elevation of the tank, showing my invention applied thereto, part of the device forming my invention being also shown in section. Fig. 2 is an elevation longitudinally of my device detached from the tank. Fig. 3 is a sectional elevation on the indicated line 3 3 of Fig. 2. Fig. 4 is a plan, partly in section, of the device. Fig. 5 is a detail end elevation of the drinking-cup on the indicated line 5 5 of Fig. 2. Fig. 6 is an elevation, partly in section, of a modified form of the device. Fig. 7 is a sectional elevation of the tube and drinking-cup detached from the tank. Fig. 8 is a sectional elevation of the device at the rear of the drinking-cup. Fig. 9 shows a modified form of valve. Fig. 10 is a transverse sectional view on the line *x x* of Fig. 9.

Heretofore devices have been constructed (in the class to which this invention relates) in which the flow of water from a tank to a drinking-cup is automatically cut off and is established or set up by the engagement of an animal's snout with releasing or opening mechanism, and considerable waste of water was found to follow the use of such devices owing to the tendency of the animals to maintain a continuous flow of water into and over the cup to form a puddle or wallowing-place in the soil adjacent to the tank. It is on account of the aforesaid tendency on the part of the animals to maintain a continuous flow of water from the tank until said tank is drained of its contents that I have provided a mechanism for controlling the flow of water independently of the action of the animal at all times.

Stock-waterers having floats and a valve in the drinking-cup just outside the barrel often fill up with dirt and grain, that prevent the free action of the float and valve and keep the animal from operating the waterer successfully. Besides, the float and valve freeze in cold weather. For these reasons I have provided means to overcome such defects and failures (without infringing on anybody's rights) by inventing a stock-waterer that has its essential operative parts protected from frost and out of the reach of animals at all times.

In the construction of the apparatus as shown the numeral 10 designates a tank, which may be of any desired size and shape, but ordinarily is of barrel form, entirely closed or open at top. An aperture is formed in one side of the tank 10 adjacent to its bottom, and a tapering metallic tube 11 is mounted in said aperture and retained therein by screw-threads 12 thereon engaging the wooden tank. It will be observed that the screw-threads 12 are located upon the outer end portion of the metallic tube 11 and that the major portion of said tube projects within the tank. The outer end portion of the metallic tube 11 is interiorly screw-threaded and engages with the exterior screw-threads of an annular shoulder 13 formed on the end wall of a drinking-cup 14 to retain said drinking-cup.

It will be observed that the end wall 15 of the drinking-cup 14 adjacent to the annular shoulder 13 is slotted vertically, which provision permits the flow of a sufficient quantity of water into the drinking-cup. It will be observed that the drinking-cup 14 has a flat bottom and flaring front and side walls 16, which front and side walls are formed in one piece continuously without angles except at the lines of demarcation with the rear wall 15. The entire drinking-cup may be cast of a single piece of metal, and such construction at this time is deemed the most desirable. A cap is mounted on the inner end portion of the tapering metallic tube 11, which cap comprises an annular collar 17, arranged to inclose and adhere to the end portion of the tube by screw-threads, an end plate 18, preferably of solid metal, connecting-bars 19, joining the collar 17 and end plate 18 integrally and separated desired distances, and a screen-covering 20, preferably of brass wire or perforated metal and wrapped about and embracing collectively the connecting-bars 19 and forming the side walls or periphery of the cap-piece. Within the tube 11 and cap-piece are mounted the several elements forming the operating mechanism whereby the feeding of the water automatically is attained, and that mechanism is about to be described. Shoulders, flanges, or webs 21 are formed upon the interior of a collar 22, seated by screwing in the interior of the inner end of the tube 11 and arranged in pairs separated by such distances as to admit the standard composed of two posts 23, connected at their tops and bottoms integrally and located within and between the shoulders 21 by a key 24. The posts 23 are horizontally apertured to admit the pin 25, on or by means of which pin a float-stem 26 is fulcrumed between said posts. The float-stem 26 extends longitudinally of and axially relative to the tube 11 and cap-piece 19, and a float 27 is fixed to the end portion of the said stem within the tube 11. The float 27 may be made of wood or hollow metal and normally rests approximately in a horizontal position within the tube, supported by the water therein. An ear 28 is formed on the collar 22 and extends within the cap-piece, or rearwardly therefrom, on which ear is fulcrumed a valve 29, the valve seating over an aperture 30 in the upper portion of a chamber 31, the walls 32 of which chamber are connected integrally with the collar 22 and extend therefrom within the cap-piece. The valve-stem 33 is hinged to the central portion of the valve 29 and extends downwardly therefrom. The valve-stem 33 is horizontally apertured to admit a pin 34 and traverses the bifurcation on the inner end of the float-stem 26, the pin 34 traversing the arms of the bifurcated portion of said float-stem and thereby pivotally connecting the float-stem and valve-stem adjustably. A wrench-seat 35 is formed on the extremity of the end wall of the chamber 31, whereby a wrench may be applied to unscrew or remove the collar 22 from the tube.

In practical use when the tube and drinking-cup are empty, or approximately so, the float 27 falls to the bottom of the tube 11, oscillates the float-stem 26, elevates the valve-stem 33 and valve 29, and permits water to flow through the screen 20 between the bars 19, through the aperture or seat 30, through the collar 22 and around the posts 23 into the tube, and from said tube through the slotted portion 13 of the drinking-cup into said cup. The flow of water continues until such time as the water within the tube elevates the float 27 to a degree sufficient to cause said float in oscillation of the float-stem 26 to reseat the valve 29 upon and to close the aperture 30 and cut off the supply of water. When the valve is closed, the tube 11 and drinking-cup are approximately full of water, and when the water is withdrawn from the drinking-cup by evaporation or animals drinking therefrom the float descends, opens the valve, and permits the replenishing of the cup from the tank, a sufficient supply of water being maintained in the tank at all times.

In Fig. 6 I show the end plate 18 apertured to receive one end portion of a pipe 50, which pipe leads from a tank or other source of water-supply distant from the location of the drinking-cup. In this figure I also show the collar 17 extending the entire length of the cap-piece and taking the place of the bars 19 and screen 20. I also show the collar 17 interiorly screw-threaded at its outer end and arranged to be screwed upon the inner end portion of the tube 11. In this manner I form a continuous passage for the water from the source of supply to the drinking-cup, obstructed only by the valve 29, which is under the control of the float 27. In Fig. 6 I show a screw 51 at the communication between the pipe 50 and cap-piece. It is designed to use the form of device illustrated in Fig. 6 in stables, barns, or other places where it is inconvenient to have a tank located in close proximity to the drinking-cup, and the advantages heretofore set up in relation to the preferred form of device follow the construction shown in this figure, since the water feeds automatically from the tank to the drinking-cup and the mechanism controlling the automatic feed of the water is entirely beyond interference on the part of the animal using the cup.

In the construction of the device as shown in Figs. 7 and 8 the lower wall of the tube 11 is inclined, so that it will permit the flow of foreign articles and substances into the drinking-cup. It will be observed that the aperture in the rear wall 15 of the drinking-cup is located at the center of said wall and a material distance above the bottom of the cup, which is a very desirable feature, since it permits the accumulation of all foreign substance in the bottom of the cup.

I claim as my invention—

1. In a stock-waterer, the combination of a tank, a tube mounted with its major portion within the tank, which tube is sustained by screw-seating one end portion in the wall of the tank, a drinking-cup mounted on the outer end portion of said tube and provided with ports communicating therewith, an ingress-port providing communication between the inner end of the tube and the interior of the tank, a valve controlling said port, and a float mounted entirely within the tube and connected with and controlling said valve.

2. In a device of the class described, a drinking-cup, a tube for conveying water to said cup, on which tube the cup is mounted, an apertured partition between said cup and tube, valve mechanism controlling the entrance to the tube opposite to the drinking-cup, which valve mechanism is mounted entirely within said tube.

3. The combination of a drinking-cup having a slotted end wall, an annular shoulder on said drinking-cup surrounding said slotted portion, a tube mounted on said annular shoulder, a valve-chamber mounted in said tube, an ingress-port in said valve-chamber, a valve controlling said ingress-port, a float pivoted to the valve and positioned within the tube, a cap-piece inclosing said valve-chamber and a screen forming the periphery of said cap-piece.

4. The combination of a drinking-cup, a tube carrying said drinking-cup, a cap-piece seated by screw-threads on said tube, a valve-chamber secured within said tube, and a screen forming the periphery of said cap-piece.

5. In a device of the class described, a tube having a screw-threaded end portion arranged for screw-seating in an aperture in a tank, a drinking-cup mounted on the outer end of said tube, a valve controlling the inner end of said tube, a float adjustably mounted within said tube and extended longitudinally thereof, connections between the inner end of the float and said valve and a screen inclosing the valve and inner end portion of the tube.

6. In a device of the class described, a tapering tube having its larger end exteriorly screw-threaded and adapted for mounting by screw-seating in an aperture in a tank and its inner end exteriorly screw-threaded, a cup mounted on the exteriorly-screw-threaded inner end portion of the tube, a drinking-cup having an inclined inner wall slotted in its central portion, a collar formed on the drinking-cup and surrounding the slotted portion thereof, which collar is screw-seated in the outer end portion of the tube, a valve-chamber screw-seated in the inner end portion of the tube, a port affording communication between the interior of the tank and the valve-chamber, a valve pivoted to the valve-chamber and controlling said port, posts mounted within the valve-chamber, a float lever or stem adjustably fulcrumed on said posts, a valve-stem pivoted to the valve and adjustably pivoted to the inner end of the float lever or stem, and a float mounted on the outer end of the float lever or stem and extended longitudinally of and entirely within the said tube.

EZRA A. LOSEE.

Witnesses:
A. B. LOSEE,
J. F. HUTCHISON.